United States Patent [19]
Schantz

[11] 3,916,139
[45] Oct. 28, 1975

[54] METHOD OF SOLDERING CONDUCTOR ENDS TO TERMINAL

[76] Inventor: Spencer C. Schantz, 16608 W. Rogers Drive, New Berlin, Wis. 53051

[22] Filed: Sept. 23, 1974

[21] Appl. No.: 508,291

[52] U.S. Cl. .............. 219/85; 29/475; 29/499; 228/5; 228/41; 336/192; 339/276 C
[51] Int. Cl.² ............... B23K 1/02; H01F 15/10
[58] Field of Search............ 29/475, 499, 628; 219/85 CA, 85 CM, 85 D, 85 F, 85 R; 228/5, 13, 41; 336/192; 339/275 A, 276 C

[56] References Cited
UNITED STATES PATENTS

| | | | |
|---|---|---|---|
| 2,324,053 | 7/1943 | Andrews | 336/192 X |
| 2,722,671 | 11/1955 | Zerwes | 339/275 AX |
| 3,347,442 | 10/1967 | Reber | 228/13 X |
| 3,359,520 | 12/1967 | Foerster | 336/192 |
| 3,590,207 | 6/1971 | Cox | 219/85 CM |
| 3,848,208 | 11/1974 | Dawson et al. | 336/192 X |

Primary Examiner—J. V. Truhe
Assistant Examiner—N. D. Herkamp
Attorney, Agent, or Firm—Arthur L. Morsell, Jr.

[57] ABSTRACT

A tab is die cut from an internal portion of an electrical terminal strip and is offset outwardly therefrom to accommodate one end of an enameled electrical conductor which is inserted thereunder, the tab being then pressed down to clamp the conductor to the terminal, any projecting end of the conductor being simultaneously cut off. One side of an electric power source is then coupled to the main portion of the terminal and the other side of the power source is momentarily coupled to the tab. The current flow through the tab heats it above soldering temperature with the heat burning the enamel off of the conductor end adjacent the tab and melting solder which is applied to the conductor end and to adjacent surfaces to solder the conductor to the terminal.

11 Claims, 7 Drawing Figures

U.S. Patent   Oct. 28, 1975   3,916,139
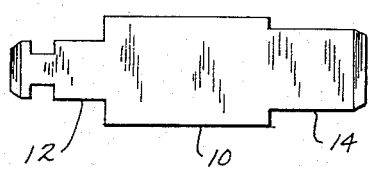
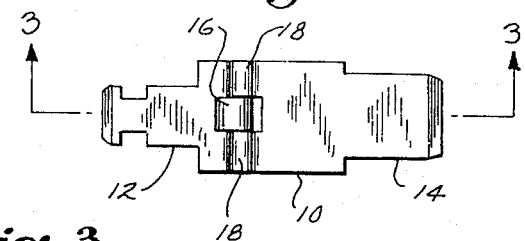
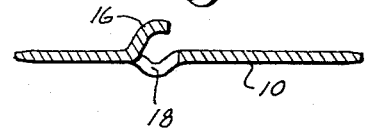
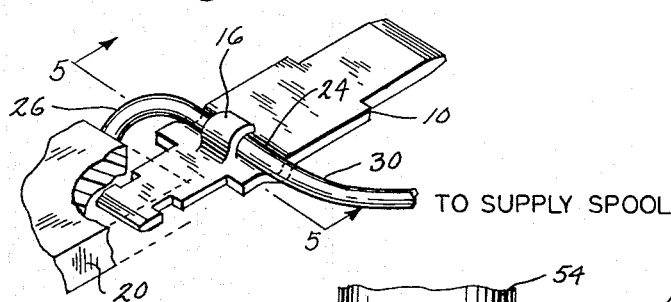
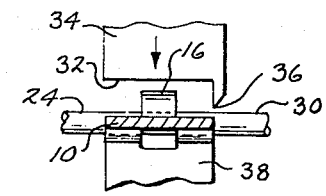
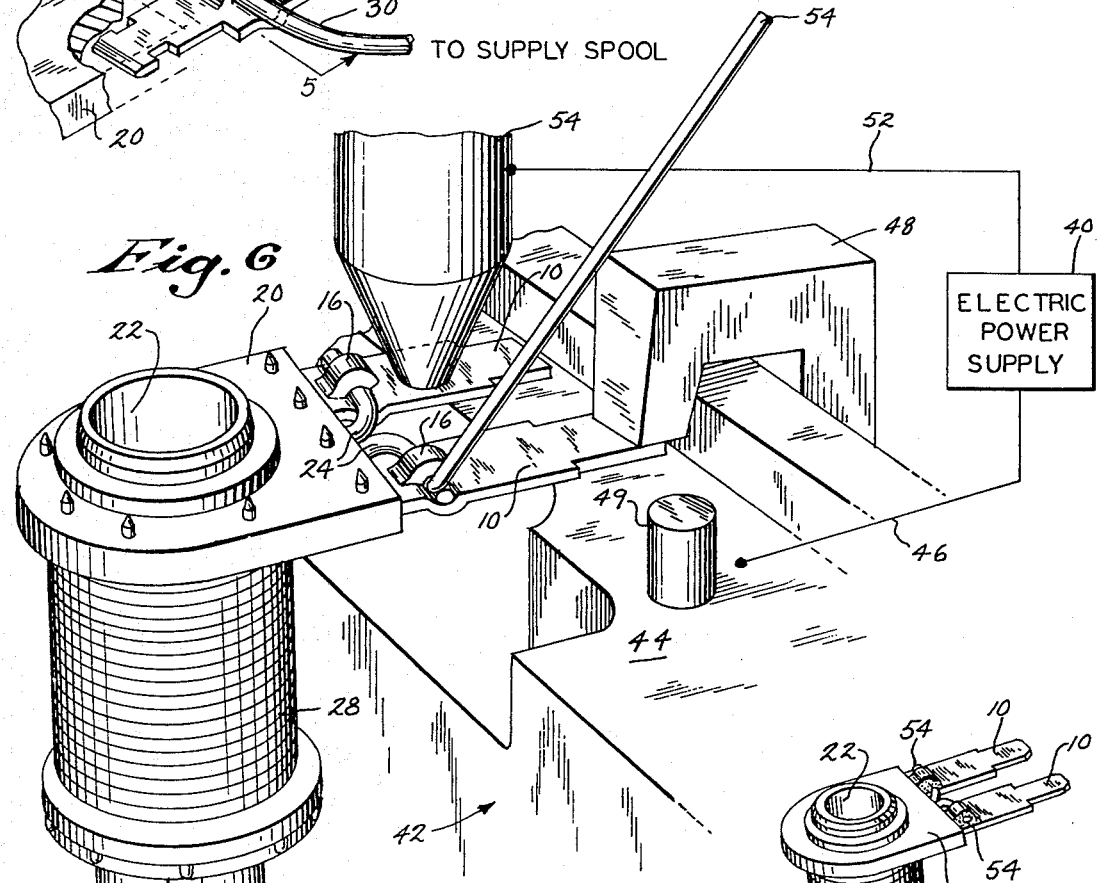
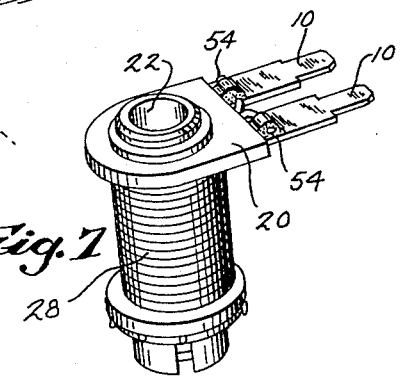

METHOD OF SOLDERING CONDUCTOR ENDS TO TERMINAL

BACKGROUND OF THE INVENTION

This invention relates to methods of soldering the ends of electrical conductors to electrical terminals. In the past, such soldering has been done with conventional soldering irons which are relatively inconvenient and time-consuming when used in assembly line operations, particularly when enameled wire is involved, since the enamel has to be scraped off the end of the wire before it can be soldered with a conventional soldering iron. Furthermore, in the past, after a coil has been wound, it is necessary to hold the end of the wire to prevent unwinding prior to soldering.

SUMMARY OF THE INVENTION

In accordance with this invention, a novel method of soldering conductor ends to electrical terminals has been devised in which a portion of the electrical terminal is used as a clamp for holding the end of the conductor to the terminal, to prevent unwinding when a newly wound coil is involved, and as an electric resistance heater for heating the conductor and the adjacent portion of the terminal to soldering temperature. The first step in the method of this invention is to die cut a tab in the terminal strip at the location where it is desired to solder the end of the conductor to the terminal. The end of the conductor, which may be an end of a newly wound coil, is then inserted under the tab, which is preferably pressed down over the conductor to clamp it in position and prevent unwinding. One side of an electric power source is then coupled to the main portion of the terminal strip and the other side of the power source is momentarily coupled to the tab. The voltage of the power source is sufficient to create a large enough current flow through the tab to heat it to soldering temperature by resistance heating. One embodiment of the invention utilizes an electrode of relatively high resistance material, relative to the resistance of the terminal, and which will be heated by the current flowing in the circuit to indirectly heat the tab by conduction. In cases where the conductor is enameled, the current flow is preferably sufficient to heat the tab to a high enough temperature to burn the enamel off the conductor adjacent the tab. Solder is subsequently applied to the conductor end and the adjacent surfaces to be melted by the heat of the tab and to thus solder the conductor to the terminal.

DESCRIPTION OF THE DRAWINGS

FIG. 1 is a plan view of an electrical terminal strip.

FIG. 2 is a plan view of the terminal shown in FIG. 1, illustrating the offset tab and groove for receiving the end of a conductor.

FIG. 3 is a longitudinal sectional view taken on the line 3—3 of FIG. 2.

FIG. 4 is a perspective view showing the terminal of FIG. 2 with a conductor inserted beneath the tab thereof, a portion of a coil bobbin extension being illustrated, and part being broken away.

FIG. 5 is a diagrammatic representation showing the step of pressing the tab down on the conductor and of simultaneously cutting the conductor off adjacent the side of the terminal.

FIG. 6 is a fragmentary perspective view of a jig and showing an electric power source for passing an electric current through terminals which are attached to a solenoid bobbin.

FIG. 7 is a perspective view of a solenoid coil which is soldered at both ends to electrical terminals.

DESCRIPTION OF THE PREFERRED EMBODIMENT

This invention can be used in any application that involves soldering an electrical conductor to an electrical terminal. However, for exemplary purposes, the invention will be described in connection with the manufacture of a solenoid coil having two conductor ends which are soldered to electrical terminal strips.

FIG. 1 is a plan view of an electrical terminal strip 10 which is shaped at one end 12 to seat in a mounting socket (see FIGS. 4 and 6) and is shaped at the other end 14 to make electrical contact with a cooperating electrical terminal (not shown). Terminal 10 can be made of brass or any other suitable electrically conductive metal to which an electrical conductor can be soldered and which can be resistance heated. The first step in the method of this invention is to die cut and offset a tab 16 (FIGS. 2 and 3) in the terminal 10 at the location where it is desired to solder the end of the conductor. The cutting and offsetting of tab 16 can be done with a conventional die set or in any desired manner. Preferably, transverse, aligned grooves 18 are formed in the portions of terminal 10 that flank tab 16 to accommodate the end of a conductor. Grooves 18 can be formed concurrently with tab 16 by the same die set that cuts and offsets tab 16. However, it should be understood that the grooves 18 are not an essential feature of the invention and can be omitted if desired.

In the illustrated embodiment of the invention, two of the terminals 10 are mounted in sockets in the end 20 (FIG. 6) of a plastic bobbin 22. As a next step, the ends 24 (FIG. 4) of a conductor 26, which is wound on bobbin 22 to form a solenoid coil 28, are inserted beneath the tabs 16 and in the grooves 18 to hold them against unwinding from coil 28. Conductor 26 in this particular example is made of enameled copper wire, and the ends 24 of conductor 26 normally overhang terminals 10 at 30 (FIG. 4) after they have been manually placed in grooves 18 and under tab 16.

In the preferred method, as a next step, tabs 16 are pressed down over the top of conductor ends 24 to clamp them to the corresponding terminal 10. This can be done by applying downward pressure on the top of tabs 16 by any suitable means. In this particular example, the downward pressure can be developed by the bottom 32 (FIG. 5) of a cutting die 34 having a sharp edge 36 which is positioned to cut the conductor off from the supply spool and simultaneously cut off all overhang 30 beyond the edge of the terminal. A suitable anvil 38 which forms a part of the die set supports terminal 10 during the cutting and pressing operation. It should be understood that while pressing of the tab is desirable, it might not be necessary if the offset of tab 16 is correct for reasonably snug insertion. It should be understood, also, that cutting the overhanging end 30 of conductor 24 is not an essential step of the invention, since in some applications there may be no overhanging end 30 to cut off.

In this particular embodiment, placing the conductor ends 24 under tabs 16 has the added advantage of preventing the solenoid coil 28 from unwinding after it has been wound. The clamping of tabs 16 down on top of conductor ends 24 further secures solenoid coil 28 from unwinding.

In this invention, the tabs 16 serve the double purpose of holding conductor ends 24 in the desired position on terminals 10, preliminary to soldering, and also act as a resistance heater to develop the heat for soldering and for burning the enamel insulation off conductor ends 24. Since tabs 16 have a significantly smaller cross-sectional area than the terminals 10, they have a significantly higher resistance to the flow of electrical current. Thus, if current is passed through tab 16 and terminal 10, a significantly higher temperature will be developed in tab 16 than in terminal 10. Therefore, the tabs 10 and the adjacent area can be electrically heated to soldering temperature without raising the entire terminal 10 to the same temperature. This is important in the case where bobbin 22 is made of a thermoplastic material, since excessive heat could cause the ends 12 (FIG. 1) of terminals 10 to enlarge the sockets in which they are seated, in the ends 20 of bobbin 22, and thus become loose or to drop out of their sockets.

Electric current flow is generated through tabs 16 by coupling one side of an electric power source 40 (FIG. 6) to the main portion of terminal strip 10 and momentarily coupling the other side of power source 40 to the corresponding tab 16. The voltage of power source 40 is selected to cause sufficient current to flow through tab 16 to heat it and conductor end 24 to the desired temperature, which in this case is a temperature high enough to burn the enamel off conductor end 24 so that it can be soldered to tab 16 and to the adjacent portions of terminal 10. In applications where the conductor ends 24 are bare copper or some other solderable metal, the voltage of power source 40 need only be sufficient to heat the conductor end 24 and adjacent surfaces to soldering temperature. The exact voltage required depends on the resistance of tab 16, which in turn depends upon the dimensions of tab 16 and the material that it is made of. However, the required voltage can be easily calculated for any given application by those skilled in the art using well known prior art formulas.

In this particular embodiment, current may be developed through tabs 16 in a jig 42 which contains an electrically conductive block 44 that is coupled by conductor 46 to one side of power source 40. Terminal 10 is clamped to block 44 by a movable clamp jaw 48. A pair of guide pins 49 are mounted on the top of block 44 to transversely align a selected terminal strip 10 under clamp jaw 48. An electrode 50 is positioned to be aligned with tab 16 when terminal 10 is clamped on block 44. Electrode 50 is coupled by conductor 52 to the other side of power source 40 and is movable by conventional means not shown into and out of contact with tab 16 only. To heat tab 16 and conductor end 24, electrode 50 is lowered into contact with tab 16 and is maintained in contact until tab 16 and wire ends 24 are heated to the desired temperature. When the desired temperature is reached, the end of a strip of solder 54 is applied to wire end 24 and to the adjacent surfaces of terminal 10 to solder the two together. Solder 54 flows around wire end 24 and solders the same to the adjacent surfaces of tab 16 and groove 18.

In one embodiment of the invention, the electrode 50 is formed of material whose resistance is high relative to the resistance of the terminal, such as carbon, which electrode is desirably pointed, to concentrate the heating, as shown in FIG. 6. With this arrangement the electrode is heated by the current flowing in the circuit, and this heat is transmitted by conduction to the tab 16 which is of small thermal mass and which has a poor thermal coupling to the rest of the terminal. Thus the tab heats rapidly to a high temperature, while the balance of the terminal desirably remains cooler than the tab.

It is to be noted from FIG. 6 that, during soldering, the terminal 10 is clamped by the jaw 48 in a location removed from the heating zone. Thus in the improved method the clamping not only supports the terminal during soldering but also completes the electric circuit.

After the above described soldering operation has been completed, the terminal 10 that was soldered is released from clamp jaw 48 and is slid to the right in FIG. 6 until it contacts guide pin 49, thereby placing the other terminal 10 under clamp jaw 48 and electrode 50. Clamp jaw 48 is then clamped down on this terminal 10 and electrode 50 is lowered into contact with tab 16 as described above to heat wire end 24 and the adjacent surfaces, which are subsequently soldered as described above. With the above described method, the wire ends 24 can be quickly and easily soldered to their respective terminals 10 on an assembly line basis. It should be understood, however, that jig 42 is not an essential feature of this invention, since other means can be utilized to hold bobbin 22 while current is being passed through tabs 16 and terminals 10.

Various changes and modifications may be made without departing from the spirit of the invention, and all such changes are contemplated as may come within the scope of the claims.

What is claimed is:

1. A method of soldering electrical conductor ends to electrical terminals comprising the following steps:
   A. cutting a tab from the metal of the terminal and offsetting the tab from the plane of the terminal;
   B. inserting a conductor end beneath the tab to temporarily hold said conductor end;
   C. making an electrical connection between the main portion of the terminal and one side of an electric power source;
   D. making an electrical connection between the tab and the other side of said power source to cause electrical current to flow through said tab and said terminal to heat said tab and said conductor end to soldering temperature; and
   E. applying solder to the conductor end to solder it to the adjacent surfaces of said terminal.

2. The method of claim 1 which includes the step of pressing the tab toward the terminal to clamp the conductor end to the terminal prior to soldering.

3. The method of claim 2 wherein a portion of said conductor end overhangs an edge of said terminal, and including the step of cutting off said overhanging end simultaneously with the pressing of the tab toward the terminal.

4. The method of claim 1 wherein said conductor is enameled and wherein sufficient current is passed through said tab to heat the tab and conductor end to a high enough temperature to remove the enamel from the conductor end.

5. The method of claim 1 and further comprising the step of forming grooves in the portion of said terminal adjacent to said offset tab to aid in accommodating said conductor end.

6. The method of claim 4 wherein the steps of cutting said tab, offsetting said tab, and forming said grooves are performed concurrently.

7. The method of claim 1 wherein a portion of said conductor end overhangs an edge of said terminal, and further comprising the step of cutting off said overhanging portion.

8. The method of claim 1 wherein said conductor end is an end of an electric coil, and wherein said step of inserting said conductor end beneath said tab also prevents the corresponding end of said coil from unwinding.

9. The method of claim 1 in which the electrical resistance of said tab is significantly higher than the resistance of the main portion of said terminal, whereby said current flow through said tab and terminal heats said tab to a significantly higher temperature than the main portion of said terminal.

10. A method as defined in claim 1 in which the power source is applied to the tab through the use of an electrode formed of material having a higher resistance than the tab.

11. A method as defined in claim 1 in which the terminal is clamped in a location removed from the heating zone to make the electrical connection between the main portion of the terminal and one side of the power source and to simultaneously support the terminal during soldering.

* * * * *